United States Patent

Hou et al.

(10) Patent No.: US 7,550,092 B2
(45) Date of Patent: Jun. 23, 2009

(54) CHEMICAL MECHANICAL POLISHING COMPOSITION

(75) Inventors: Hui-Fang Hou, Kaohsiung County (TW); Wen-Cheng Liu, Kaohsiung County (TW); Pao-Cheng Chen, Kaohsiung County (TW); Yen-Liang Chen, Kaohsiung County (TW); Jui-Ching Chen, Kaohsiung County (TW)

(73) Assignee: Epoch Material Co., Ltd., Kaohsiung County (TW)

( * ) Notice: Subject to any disclaimer, the term of this patent is extended or adjusted under 35 U.S.C. 154(b) by 0 days.

(21) Appl. No.: 11/454,981

(22) Filed: Jun. 19, 2006

(65) Prior Publication Data

US 2007/0290165 A1    Dec. 20, 2007

(51) Int. Cl.
*C09K 13/00* (2006.01)
(52) U.S. Cl. .......................... 252/79; 252/79.1; 216/13; 216/106; 438/690; 438/691; 438/692; 438/693
(58) Field of Classification Search .............. 251/79.1; 216/106; 438/690, 680; 252/79.1
See application file for complete search history.

(56) References Cited

U.S. PATENT DOCUMENTS

| | | | |
|---|---|---|---|
| 6,436,834 B1 * | 8/2002 | Lee et al. ................. | 438/693 |
| 6,447,563 B1 | 9/2002 | Mahulikar | |
| 6,716,281 B2 * | 4/2004 | Bernards et al. ........ | 106/287.21 |
| 6,786,945 B2 * | 9/2004 | Machii et al. ............ | 51/307 |
| 6,846,177 B1 | 1/2005 | Hutchens | |
| 7,144,848 B2 * | 12/2006 | Zhou et al. ............... | 510/175 |
| 2005/0050803 A1 | 3/2005 | Amanokura et al. | |
| 2005/0181609 A1 | 8/2005 | Kurata et al. | |

FOREIGN PATENT DOCUMENTS

| | | |
|---|---|---|
| CN | 03809590.4 | 8/2005 |
| KR | 10-2005-0042038 | 5/2005 |
| TW | 574352 | 2/2004 |

OTHER PUBLICATIONS

Chinese Office Action in Serial No. 2006100666408, citing Chinese publication No. CN 03809590.4, received Jul. 25, 2008 [no translation].

Korean Office Action in Serial No. KR 10-2007-0025038, citing Korean publication No. 10-2005-0042038, mailed Feb. 29, 2008 [no translation].

* cited by examiner

*Primary Examiner*—Norton Nadine
*Assistant Examiner*—Maki Angadi
(74) *Attorney, Agent, or Firm*—Davidson Berquist Jackson & Gowdey LLP

(57) ABSTRACT

A chemical mechanical polishing composition includes: an abrasive component, a corrosion inhibitor, a surfactant, a diacid compound, a metal residue inhibitor, and water. The metal residue inhibitor is selected from the group of compounds having the following formulas:

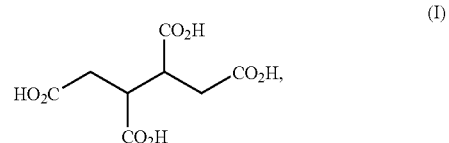

(I)

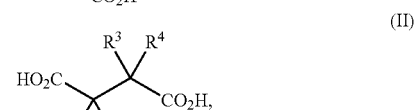

(II)

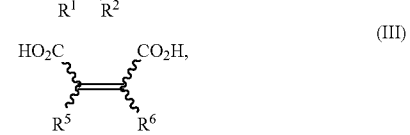

(III)

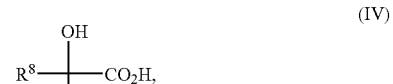

(IV)

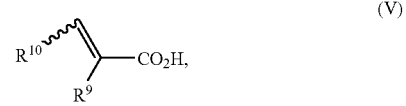

(V)

and combinations thereof, wherein $R^1$, $R^2$, $R^3$, and $R^4$ are independently selected from H, $C_1$-$C_6$ alkyl, $C_2$-$C_6$ alkenyl, and $C_2$-$C_6$ alkylidyne; and $R^5$, $R^6$, $R^7$, $R^8$, $R^9$, and $R^{10}$ are independently selected from H and $C_1$-$C_6$ alkyl.

21 Claims, No Drawings

CHEMICAL MECHANICAL POLISHING COMPOSITION

BACKGROUND OF THE INVENTION

1. Field of the Invention

This invention relates to a chemical mechanical polishing composition, more particularly to a chemical mechanical polishing composition that can prevent undesired metal residue and dishing effect on a wafer surface.

2. Description of the Related Art

Chemical mechanical polishing is a technique for removing defects on a wafer surface so as to achieve planarity of the surface, thereby eliminating focusing problems during photolithography process. The chemical mechanical polishing technique was originally used in manufacturing micro devices having a size less than 0.5 micron. However, with the current trend of minimization of devices, chemical mechanical polishing technique has been widely employed in the industry.

In the process for manufacturing an integrated circuit, a polishing process is employed to planarize an interlayer (e.g., silicon oxide and silicon nitride), and a metal wire used to connect active devices. The method for polishing a metal wire, e.g., tungsten, copper, aluminum, etc., includes the steps of disposing a semiconductor wafer on a polishing stage provided with a polishing head, and applying an abrasive particle-containing slurry to a surface of the semiconductor wafer so as to improve polishing efficiency. Two mechanisms can be chosen for polishing the metal wire using the slurry composition. In the first mechanism, components in the slurry composition react with the metal wire to continuously form an oxide layer on the metal surface, and the abrasive particles in the slurry composition act to polish and to remove the oxide layer. An oxidizing agent is generally required in the first mechanism. In the second mechanism, no protective oxide layer is formed. Instead, the components in the slurry composition attack and dissolve the metal, and the mechanical action of the abrasive particles enhances the dissolution rate so as to reduce the thickness of the metal wire. Because of the uneven polishing problem in the CMP process, undesired dishing effect and undesired metal residue on the wafer surface tend to take place.

U.S. Pat. No. 6,447,563 discloses a slurry system used for polishing metal layers. The slurry system includes a first part and a second part, and has a pH value ranging from 2 to 11. The first part comprises a dispersion solution consisting essentially of an abrasive, a stabilizing agent, and a surfactant. The second part comprises an activator solution, free of abrasives, having at least two components selected from the group consisting of an oxidizer, acids, amines, chelating agent, fluorine-containing compounds, corrosion inhibitors, biological agents, surfactants, buffering agents, and mixtures thereof. The acid in the activator solution of the second part can be an organic acid, such as formic acid, acetic acid, lactic acid, etc., or an inorganic acid, such as hydrochloric acid, sulfuric acid, etc. Preferred acids are those containing one or more carboxylic acid groups substituted with hydroxyl groups, such as malic acid, tartaric acid, gluconic acid, and citric acid. In addition, the surfactant can be non-ionic, anionic, cationic, or amphoteric surfactant. In the example 1 of this patent, a slurry system constituted of 4 wt % fumed silica, 1 wt % $H_2O_2$, and 0.1 molar propanoic acid was used to polish a copper wafer. The removal rate was greater than 450 nm and the non-uniformity was less than 5%. This patent primarily focuses on the improvement of the polishing rate. The problem of the metal residue on the wafer surface is not addressed in this patent.

U.S. Pat. No. 6,846,177 discloses a method for manufacturing a metal line contact plug of a semiconductor device by a Chemical Mechanical Polishing (CMP) process. The method includes the steps of: (1) performing a first CMP process using a first slurry solution including 1 to 20 wt % of abrasive, 0.1 to 15 wt % of oxidizer, and 0.01 to 10 wt % of complexing agent based on the total weight of the first slurry solution, and having an etching selectivity of more than 10 for a metal/insulating film and a pH ranging from 2 to 9; and (2) performing a second CMP process using a second slurry solution including 5 to 30 wt % of abrasive and 0.01 to 5 wt % of oxidizer based on the total weight of the second slurry solution, and having an etching selectivity of less than 3 for the metal/insulating film and a pH ranging from 6 to 12. The complexing agent of the first slurry solution is selected from the group consisting of citric acid, tartaric acid, succinic acid, malic acid, maleic acid, fumaric acid, malonic acid, EDTA, glycolic acid, salts thereof, and mixtures thereof. This patent solves the problem that a metal line contact plug is not separated well. The problems caused by the uneven polish are not mentioned.

TW patent publication No. 574352 discloses a slurry composition for Chemical Mechanical Polishing (CMP) process and use thereof. The slurry composition includes 70 to 99.5 wt % of aqueous solvent, 0.1 to 25 wt % of abrasive particles, 0.01 to 1 wt % of corrosion inhibitor, and 0.01 to 1 wt % of chemicals. The chemicals are selected from the group consisting of compounds having the following formulas:

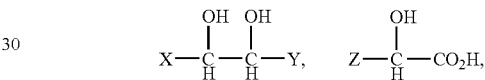

and the combination thereof, wherein X, Y, and Z are independently selected from the group consisting of: H and $C_1$-$C_6$ alkyl. The object of this reference is to prevent copper dishing.

Since the components of the slurry composition for CMP process have great effect on the polishing rate, dishing degree, and metal residue on the wafer surface, there is a need in the art to provide a composition that can eliminate the problems of metal dishing and metal residue while maintaining desired polishing rate.

SUMMARY OF THE INVENTION

Therefore, the object of the present invention is to provide a chemical mechanical polishing composition that can overcome at least one of the aforesaid drawbacks of the prior art.

According to this invention, a chemical mechanical polishing composition comprises: an abrasive component, a corrosion inhibitor, a surfactant, a diacid compound, a metal residue inhibitor, and water, the metal residue inhibitor being selected from the group consisting of compounds having the following formulas:

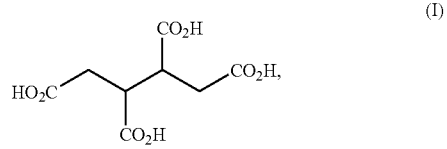

(I)

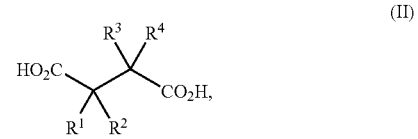

(II)

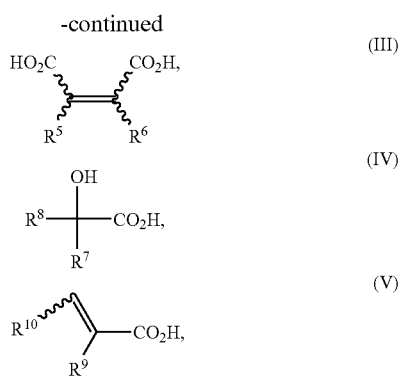

and combinations thereof, wherein $R^1$, $R^2$, $R^3$, and $R^4$ are independently selected from the group consisting of: H, $C_1$-$C_6$ alkyl, $C_2$-$C_6$ alkenyl, and $C_2$-$C_6$ alkylidyne; and $R^5$, $R^6$, $R^7$, $R^8$, $R^9$, and $R^{10}$ are independently selected from the group consisting of: H and $C_1$-$C_6$ alkyl.

DETAILED DESCRIPTION OF THE PREFERRED EMBODIMENT

The preferred embodiment of a chemical mechanical polishing composition according to the present invention includes an abrasive component, a corrosion inhibitor, a surfactant, a diacid compound, a metal residue inhibitor, and water. The metal residue inhibitor is selected from the group consisting of compounds having the following formulas:

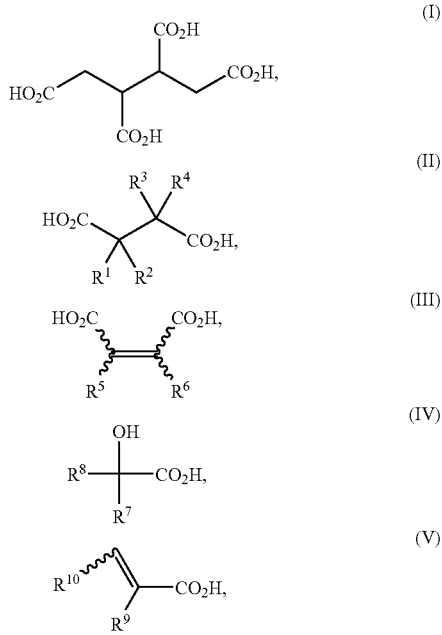

and combinations thereof, wherein $R^1$, $R^2$, $R^3$, and $R^4$ are independently selected from the group consisting of: H, $C_1$-$C_6$ alkyl, $C_2$-$C_6$ alkenyl, and $C_2$-$C_6$ alkylidyne; and $R^5$, $R^6$, $R^7$, $R^8$, $R^9$, and $R^{10}$ are independently selected from the group consisting of: H and $C_1$-$C_6$ alkyl.

The abrasive component is present in an amount ranging from 0.10 to 25.00 wt %, the corrosion inhibitor is present in an amount ranging from 0.01 to 1.00 wt %, the surfactant is present in an amount ranging from 0.01 to 1.00 wt %, the diacid compound is present in an amount ranging from 0.01 to 1.00 wt %, the metal residue inhibitor is present in an amount ranging from 0.01 to 1.00 wt %, and the remainder is water.

Preferably, when the metal residue inhibitor is selected from the group consisting of compound (I), compound (II), compound (III), and compound (IV), the content of each of the components is as follows: the abrasive component is 0.50 to 10.00 wt %, the corrosion inhibitor is 0.01 to 0.50 wt %, the surfactant is 0.01 to 0.50 wt %, the diacid compound is 0.05 to 1.00 wt %, the metal residue inhibitor is 0.01 to 0.50 wt %, and the remainder is water. More preferably, the abrasive component is 0.50 to 5.00 wt %, the corrosion inhibitor is 0.01 to 0.20 wt %, the surfactant is 0.01 to 0.30 wt %, the diacid compound is 0.10 to 1.00 wt %, the metal residue inhibitor is 0.01 to 0.30 wt %, and the remainder is water. In particular, when the metal residue inhibitor is compound (I), the content thereof ranges from 0.01 to 0.10 wt %.

Alternatively, when the metal residue inhibitor is compound (V), the content of each of the components is as follows: the abrasive component is 0.50 to 10.00 wt %, the corrosion inhibitor is 0.01 to 0.50 wt %, the surfactant is 0.01 to 0.50 wt %, the diacid compound is 0.05 to 1.00 wt %, the metal residue inhibitor is 0.05 to 1.00 wt %, and the remainder is water. More preferably, the abrasive component is 0.50 to 5.00 wt %, the corrosion inhibitor is 0.01 to 0.20 wt %, the surfactant is 0.01 to 0.30 wt %, the diacid compound is 0.10 to 1.00 wt %, the metal residue inhibitor is 0.05 to 0.50 wt %, and the remainder is water.

It should be noted herein that the polishing rate can be enhanced by increasing the amount of the diacid compound if it is below 3000 Å/min. The amount of the surfactant can be increased to reduce the dishing degree, and the amount of the metal residue inhibitor can be increased to alleviate the metal residue problem.

Preferably, the composition has a pH value ranging from 2 to 5, and more preferably, from 3 to 4.

Preferably, compound (II) is selected from the group consisting of 2,2-dimethylsuccinic acid, 2-ethyl-2-methylsuccinic acid, 2,3-dimethylsuccinic acid, and methylenesuccinic acid.

Compound (III) can be cis or trans. Preferably, compound (III) is selected from the group consisting of maleic acid, 2-methyl maleic acid, fumaric acid, and 2-methyl fumaric acid.

Preferably, compound (IV) is selected from the group consisting of 2-hydroxy acetic acid, 2-methyl-2-hydroxy acetic acid, 2-ethyl-2-hydroxy acetic acid, 2,2-diethyl-2-hydroxy acetic acid, and 2-ethyl-2-methyl-2-hydroxy acetic acid.

Preferably, compound (V) is selected from the group consisting of acrylic acid, 2-methylacrylic acid, 2-ethyl acrylic acid, 3-methyl acrylic acid, and 2,3-dimethyl acrylic acid.

The surfactant suitable for use in this invention varies based on actual requirements. Preferably, the surfactant is anionic type or nonionic type.

The abrasive component is a commercially available product and varies based on actual requirements. Preferably, the abrasive component is selected from the group consisting of: $SiO_2$, $Al_2O_3$, $ZrO_2$, $CeO_2$, SiC, $TiO_2$, $Si_3N_4$, and combinations thereof. Moreover, the particle size varies based on actual requirements. Preferably, the particle size ranges from 15 nm to 30 nm.

The corrosion inhibitor can be any commercially available product that has been used in the semiconductor field and that has corrosion inhibiting effect. Preferably, the corrosion inhibitor is selected from the group consisting of benzotriazole, 1,3,5-triazine-2,4,6,-triol, 1,2,3-triazole, 3-amino-1,2,4-triazole, 3-nitro-1,2,4-triazole, 4-amino-3-hydrazino-1,2,4-triazole-5-thiol, benzotriazole-5-carboxylic acid, 3-amino-1,2,4-triazole-5-carboxylic acid, 1-hydroxy benzotriazole, nitrobenzotriazole, and combinations thereof.

The diacid compound can be linear or branched. Preferably, the diacid compound is selected from the group consisting of: succinic acid, adipic acid, glutaric acid, and combinations thereof.

The water used in this invention is preferably deionized water.

The method for making the chemical mechanical polishing composition includes the steps of mixing the abrasive component, the surfactant, the corrosion inhibitor, the diacid compound, the metal residue inhibitor, and deionized water; and adjusting the pH value of the mixture to a range within 2 and 5, preferably within 3 and 4, using a suitable acid or base. The suitable acid or base is not limited. Preferably, the acid is hydrogen chloride or nitric acid. The base can be ammonia or tetramethylammonium hydroxide (TMAH).

Preferably, the CMP composition further includes an oxidizing agent selected from the group consisting of hydrogen peroxide, ferric nitrate, potassium iodate, acetic hydroperoxide, and potassium permanganate. The weight ratio of the oxidizing agent to the mixture of the abrasive component, the corrosion inhibitor, the surfactant, the diacid compound, the metal residue inhibitor, and deionized water ranges from 1:9 to 1:30.

Preferably, the chemical mechanical polishing composition further includes formic acid so as to increase the polishing rate and to reduce the dishing effect on the wafer surface. The amount of formic acid can be adjusted according to actual requirements, and preferably ranges from 0.01 to 1.00 wt %.

EXAMPLES

The following metal residue inhibitor compounds, 1,2,3,4-butanetetracarboxylic acid (which is hereinafter referred as compound (I)), methylenesuccinic acid, fumaric acid, 2-hydroxy acetic acid, and acrylic acid (which are available from Aldrich Company), were used for preparing CMP compositions of Examples 1 to 9. Each of the compounds was mixed with 2.00 wt % of colloidal silica, 0.05 wt % of benzotriazole, 0.4 wt % of adipic acid, 0.2 wt % anionic surfactant, optional formic acid, and water so as to obtain a mixture. Hydrogen peroxide was mixed into each of the mixtures at the weight ratio of 1:11, followed by adjusting the pH value to range from 3 to 4 so as to form the CMP compositions of Examples 1 to 9. The type and amount of the metal residue inhibitor and the diacid compound, and the amount of formic acid used in Examples 1 to 9 are shown in Table 1.

The CMP compositions of the comparative examples 1 to 4 were prepared by mixing 2.00 wt % of colloidal silica with 0.05 wt % of benzotriazole, the diacid compound (0.4 wt % of adipic acid, a mixture 0.4 wt % of adipic acid and 0.1 wt % of glutaric acid, and a mixture of 0.4 wt % of adipic acid and 0.2 wt % of glutaric acid were used for the comparative examples 1 to 4), 0.2 wt % anionic surfactant, optional formic acid, and water. In the comparative examples, there is no metal residue inhibitor.

The compositions in Examples 1 to 9 of this invention and the compositions in the comparative examples 1 to 4 were used to polish a wafer having a copper metal layer (made by Sematech Company, 0.18 µm line width) on a polishing device (AMAT/Mirra, made by Applied Material, INC.) under conditions of 1.0 to 1.5 psi membrane pressure, 1.8 psi retaining ring pressure, 70 rpm platen speed, 74 rpm carrier speed, 25° C., and 200 mL/min slurry flow rate. The polishing stage used in the examples is CUP 4410. The polishing time was determined by End Point System incorporated in the polishing device. After the polishing, a further 20% over-polishing was conducted. Wafer cleaning using a cleaning device (Evergreen Model 10X, made by Solid State Equipment Corp.), and nitrogen drying were conducted subsequently.

The polishing rate was determined by the removed thickness of the copper metal per minute. The removed thickness of the copper metal was measured by KLA-Tencor RS-75 made by KLA-TENCOR Company.

The dishing degree was determined by a Surface Profiler (KLA-Tencor P-11, made by KLA-TENCOR Company) to measure the dishing between a barrier layer and a copper line having 100 µm line width which is used as a measuring reference.

The metal residue was observed by naked eye.

TABLE 1

| | Diacid compound/ amount (wt %) | Formic acid (wt %) | Metal residue inhibitor/ amount (wt %) | polishing rate (Å/min) | Dishing degree (Å/100 µm Cu line width) | Metal residue |
|---|---|---|---|---|---|---|
| Comp. Exp. 1 | Adipic acid/0.4 | — | — | 4566 | 784 | Yes (worst) |
| Comp. Exp. 2 | Glutaric acid/0.1 Adipic acid/0.4 | — | — | 6044 | 452 | Yes (partially) |
| Comp. Exp. 3 | Glutaric acid/0.2 Adipic acid/0.4 | — | — | 6438 | 440 | Yes (partially) |
| Comp. Exp. 4 | Adipic acid/0.4 | 0.1 | — | 6390 | 416 | Yes (partially) |
| Exp. 1 | Adipic acid/0.4 | — | Compound (I)/0.02 | 4882 | 468 | No |
| Exp. 2 | Adipic acid/0.4 | — | Compound (I)/0.06 | 5630 | 579 | No |

TABLE 1-continued

|   | Diacid compound/ amount (wt %) | Formic acid (wt %) | Metal residue inhibitor/ amount (wt %) | polishing rate (Å/min) | Dishing degree (Å/100 μm Cu line width) | Metal residue |
|---|---|---|---|---|---|---|
| Exp. 3 | Adipic acid/0.4 | — | Methylene succinic acid/0.1 | 5435 | 418 | No |
| Exp. 4 | Adipic acid/0.4 | — | Compound (I)/0.06 Methylene succinic acid/0.1 | 5745 | 549 | No |
| Exp. 5 | Adipic acid/0.4 | — | fumaric acid/0.06 | 5475 | 397 | No |
| Exp. 6 | Adipic acid/0.4 | — | 2-hydroxy acetic acid/0.05 | 5127 | 397 | No |
| Exp. 7 | Adipic acid/0.4 | — | Compound (I)/0.06 2-hydroxy acetic acid/0.05 | 5945 | 692 | No |
| Exp. 8 | Adipic acid/0.4 | — | acrylic acid/0.5 | 5294 | 344 | No |
| Exp. 9 | Adipic acid/0.4 | 0.1 | Compound (I)/0.02 | 6313 | 426 | No |

"—" means not added.

It is noted from Table 1 that, in Examples 1 to 9 of this invention, no metal residue was observed on the wafer surface, the dishing degree was below 700 Å, and the polishing rate was kept above 4800 Å/min. However, the metal residue was observed in each comparative example. In addition, it is noted from Examples 1 and 2, 3 and 4, and 6 and 7, an increased amount of compound (I), a combination of Compound (I) and methylenesuccinic acid, and a combination of Compound (I) and 2-hydroxy acetic acid also improve the polishing rate. Moreover, comparing Example 9 with comparative example 1, addition of formic acid improves polishing rate and reduces dishing degree and metal residue phenomena.

With the inclusion of the metal residue inhibitor, the surfactant, the corrosion inhibitor, and the diacid compound in the CMP composition of this invention, the CMP composition can not only reduce the dishing and metal residue phenomena but also maintain the polishing rate above 4800 Å/min.

While the present invention has been described in connection with what is considered the most practical and preferred embodiments, it is understood that this invention is not limited to the disclosed embodiments but is intended to cover various arrangements included within the spirit and scope of the broadest interpretation and equivalent arrangements.

What is claimed is:

1. A chemical mechanical polishing composition composing: an abrasive component, a corrosion inhibitor, a surfactant, a diacid compound, a metal residue inhibitor having the following formula (I), and water:

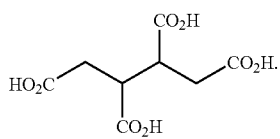

(I)

2. The chemical mechanical polishing composition of claim 1, wherein said abrasive component is present in an amount ranging from 0.10 to 25.00 wt %, said corrosion inhibitor is present in an amount ranging from 0.01 to 1.00 wt %, said surfactant is present in an amount ranging from 0.01 to 1.00 wt %, said diacid compound is present in an amount ranging from 0.01 to 1.00 wt %, said metal residue inhibitor is present in an amount ranging from 0.01 to 1.00 wt %, and the remainder is water.

3. The chemical mechanical polishing composition of claim 2, wherein said abrasive component is present in an amount ranging from 0.50 to 10.00 wt %.

4. The chemical mechanical polishing composition of claim 3, wherein said abrasive component is present in an amount ranging from 0.50 to 5.00 wt %.

5. The chemical mechanical polishing composition of claim 2, further comprising 0.01 to 1.00 wt % formic acid.

6. The chemical mechanical polishing composition of claim 2, wherein said corrosion inhibitor is present in an amount ranging from 0.01 to 0.50 wt %.

7. The chemical mechanical polishing composition of claim 6, wherein said corrosion inhibitor is present in an amount ranging from 0.01 to 0.20 wt %.

8. The chemical mechanical polishing composition of claim 2, wherein said surfactant is present in an amount ranging from 0.01 to 0.50 wt %.

9. The chemical mechanical polishing composition of claim 8, wherein said surfactant is present in an amount ranging from 0.10 to 0.30 wt %.

10. The chemical mechanical polishing composition of claim 2, wherein said diacid compound is present in an amount ranging from 0.05 to 1.00 wt %.

11. The chemical mechanical polishing composition of claim 10, wherein said diacid compound is present in an amount ranging from 0.10 to 1.00 wt %.

12. The chemical mechanical polishing composition of claim 2, wherein said metal residue inhibitor is present in an amount ranging from 0.01 to 0.50 wt %.

13. The chemical mechanical polishing composition of claim 12, wherein said metal residue inhibitor is present in an amount ranging from 0.01 to 0.30 wt %.

14. The chemical mechanical polishing composition of claim 1, wherein said corrosion inhibitor is selected from the group consisting of benzotriazole, 1,3,5-triazine-2,4,6,-triol, 1,2,3-triazole, 3-amino-1,2,4-triazole, 3-nitro-1,2,4-triazole, 4-amino-3-hydrazino-1,2,4-triazole-5-thiol, benzotriazole-5-carboxylic acid, 3-amino-1,2,4-triazole-5-carboxylic acid, 1-hydroxy benzotriazole, nitrobenzotriazole, and combinations thereof.

15. The chemical mechanical polishing composition of claim 1, wherein said surfactant is selected from the group consisting of anionic type and nonionic type.

16. The chemical mechanical polishing composition of claim 1, wherein said composition has a pH value ranging from 2 to 5.

17. The chemical mechanical polishing composition of claim 16, wherein said composition has a pH value ranging from 3 to 4.

18. The chemical mechanical polishing composition of claim 1, wherein said abrasive component is selected from the group consisting of: $SiO_2$, $Al_2O_3$, $ZrO_2$, $CeO_2$, SiC, $TiO_2$, $Si_3N_4$, and combinations thereof.

19. The chemical mechanical polishing composition of claim 1, further comprising an oxidizing agent selected from the group consisting of hydrogen peroxide, ferric nitrate, potassium iodate, acetic hydroperoxide, and potassium permanganate.

20. The chemical mechanical polishing composition of claim 19, wherein the weight ratio of said oxidizing agent to the mixture of said abrasive component, said corrosion inhibitor, said surfactant, said diacid compound, said metal residue inhibitor, and water ranges from 1:9 to 1:30.

21. The chemical mechanical polishing composition of claim 1, wherein said diacid compound is selected from the group consisting of: succinic acid, adipic acid, glutaric acid, and combinations thereof.

* * * * *